US012395283B2

(12) United States Patent
Tian et al.

(10) Patent No.: US 12,395,283 B2
(45) Date of Patent: Aug. 19, 2025

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventors: Zhong Tian, Beijing (CN); Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 438 days.

(21) Appl. No.: 17/916,027

(22) PCT Filed: Apr. 8, 2021

(86) PCT No.: PCT/CN2021/085893
§ 371 (c)(1),
(2) Date: Sep. 30, 2022

(87) PCT Pub. No.: WO2021/208791
PCT Pub. Date: Oct. 21, 2021

(65) Prior Publication Data
US 2023/0171049 A1 Jun. 1, 2023

(30) Foreign Application Priority Data
Apr. 15, 2020 (CN) .......................... 202010294676.1

(51) Int. Cl.
*H04L 5/00* (2006.01)
*H04W 16/14* (2009.01)
*H04W 72/23* (2023.01)

(52) U.S. Cl.
CPC .......... *H04L 5/0012* (2013.01); *H04W 16/14* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2021/0075579 A1* | 3/2021 | Liu | H04L 5/0098 |
| 2021/0160917 A1* | 5/2021 | Goto | H04W 72/0446 |
| 2023/0084494 A1* | 3/2023 | Wei | H04L 5/0044 370/329 |

FOREIGN PATENT DOCUMENTS

| | | |
|---|---|---|
| CN | 109478968 A | 3/2019 |
| CN | 110831172 A | 2/2020 |

(Continued)

OTHER PUBLICATIONS

International Search Report and Written Opinion mailed on Jun. 23, 2021, received for PCT Application PCT/CN2021/085893, filed on Apr. 8, 2021, 11 pages including English Translation.

(Continued)

*Primary Examiner* — Clemence S Han
(74) *Attorney, Agent, or Firm* — XSENSUS LLP

(57) ABSTRACT

An electronic device and method for wireless communication, and a computer-readable storage medium; the electronic device comprises: a processing circuit, which is configured to: acquire radio resource control (RRC) signaling from a base station, the RRC signaling comprising configuration information used by a user equipment (UE) for a frequency hopping operation during broadband uplink transmission on an unlicensed frequency band, and the UE switching between multiple sub-bands in the broadband by using the frequency hopping operation so as to execute uplink transmission; and acquire downlink control information from the base station, the downlink control information comprising activation information for the frequency hopping operation.

11 Claims, 11 Drawing Sheets

(56) References Cited

FOREIGN PATENT DOCUMENTS

CN    111480386 A    7/2020
WO    2018/064525 A1    4/2018

OTHER PUBLICATIONS

NEC, "Frequency hopping for NR UL Pusch", 3GPP TSG-RAN WG1 Meeting #90bis, R1-1717153, pp. 1-3.

\* cited by examiner

ELECTRONIC DEVICE AND METHOD FOR WIRELESS COMMUNICATION, AND COMPUTER-READABLE STORAGE MEDIUM

CROSS-REFERENCE TO RELATED APPLICATIONS

The present application is based on PCT filing PCT/CN2021/085893, filed Apr. 8, 2021, which claims priority to Chinese Patent Application No. 202010294676.1, titled "ELECTRONIC DEVICE AND METHOD FOR WIRELESS COMMUNICATION, AND COMPUTER-READABLE STORAGE MEDIUM", filed on Apr. 15, 2020 with the China National Intellectual Property Administration (CNIPA), the entire contents of each are incorporated herein by reference in its entirety.

FIELD

The present disclosure relates to the technical field of wireless communications, and in particular to a frequency hopping technology for uplink transmission on an unlicensed Spectrum. More specifically, the present disclosure relates to an electronic apparatus and a method for wireless communications and a computer-readable storage medium.

BACKGROUND

According to Release 16 of 3GPP, the access technology on unlicensed frequency bands has become an important part of the standardization of new radio in 5th Generation Networks (5G NR). The main difference between NR-U (new radio unlicensed) based on unlicensed frequency bands and NR based on licensed frequency bands is that it is required to monitor a channel before each transmission to determine whether the channel is idle, which is referred to as, for example, a listen before talk (LBT) technology. The reason is that the frequency band to be used by the NR-U may also be used by other devices such as WiFi devices, and thus interferences to other devices in communication may be avoided with the LBT technology. In the discussion of the NR-U technology of Release 16, the duration of the LBT is generally set to 16 us or 25 us. A shorter LBT duration facilitates user equipment (UE) to preempt an idle channel faster.

In Release 16, NR-U may operate under a wide band condition. For example, on an unlicensed frequency band of 5 GHz, NR-U needs to coexist with WiFi. As shown in FIG. 1, the unlicensed frequency band is distributed in 5150 MHz to 5350 MHz and 5470 MHz to 5710 MHz respectively. Generally, a sub-band has a bandwidth of 20 MHz, and a UE may use one carrier (BWP) that generally includes four consecutive sub-bands. Before transmitting data, the UE may perform LBT on all the sub-bands in the BWP. In a case that clear channel assessments (CCA) of all sub-bands or part of the sub-bands is successful, the UE is allowed to transmit Physical Uplink Shared Channel (PUSCH) on a sub-band with the successful clear channel assessment.

In 5G communication, high reliability and low latency communication (URLLC) scenario is an important scenario, which requires high reliability or is sensitive to latency. In a case of adopting NR-U, since it is required to perform LBT for data transmission, the transmission may be affected due to LBT failures, which may deteriorate the latency and reduce the reliability.

Therefore, it is desired to provide a solution for ensuring the reliability of data transmission in NR-U and/or reducing the latency.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: acquire, from a base station, a radio resource control (RRC) signaling which includes configuration information of a frequency-hopping operation for uplink transmission in wide band of a user equipment (UE) on an unlicensed frequency band, wherein the UE switches among multiple sub-bands in the wide band to perform the uplink transmission by the frequency-hopping operation; and acquire, from the base station, downlink control information (DCI) which includes activation information for the frequency-hopping operation.

According to another aspect of the present disclosure, a method for wireless communications is provided. The method includes: acquiring, from a base station, an RRC signaling which includes configuration information of a frequency-hopping operation for uplink transmission in wide band of a UE on an unlicensed frequency band, wherein the UE switches among multiple sub-bands in the wide band to perform the uplink transmission by the frequency-hopping operation; and acquiring, from the base station, DCI which includes activation information for the frequency-hopping operation.

According to one aspect of the present disclosure, an electronic apparatus for wireless communications is provided. The electronic apparatus includes processing circuitry. The processing circuitry is configured to: transmit, to a UE, an RRC signaling which includes configuration information of a frequency-hopping operation for uplink transmission in wide band of a UE on an unlicensed frequency band, wherein the UE switches among multiple sub-bands in the wide band to perform the uplink transmission by the frequency-hopping operation; and transmit, to the UE, DCI which includes activation information for the frequency-hopping operation.

According to another aspect of the present disclosure, a method for wireless communications is provided. The method includes: transmitting, to a UE, an RRC signaling which includes configuration information of a frequency-hopping operation for uplink transmission in wide band of a UE on an unlicensed frequency band, wherein the UE switches among multiple sub-bands in the wide band to perform the uplink transmission by the frequency-hopping operation; and transmitting, to the UE, DCI which includes activation information for the frequency-hopping operation.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and method according to the embodiments of the present disclosure, the frequency-hopping technology is adopted in the uplink transmission in wide band on the unlicensed frequency band, so that the uplink transmission can be switched among sub-bands, improving the reliability of the uplink transmission and effectively reducing the latency.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
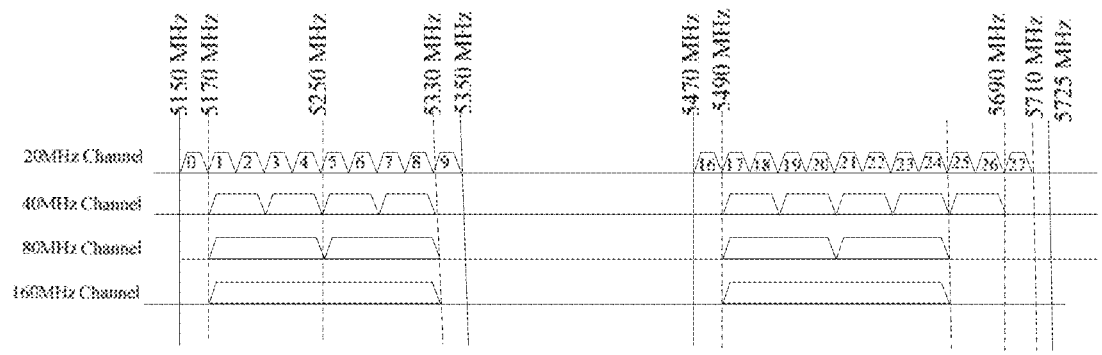
FIG. 1 shows a schematic diagram of a distribution of an unlicensed frequency band of 5 GHz.
Figure 2:
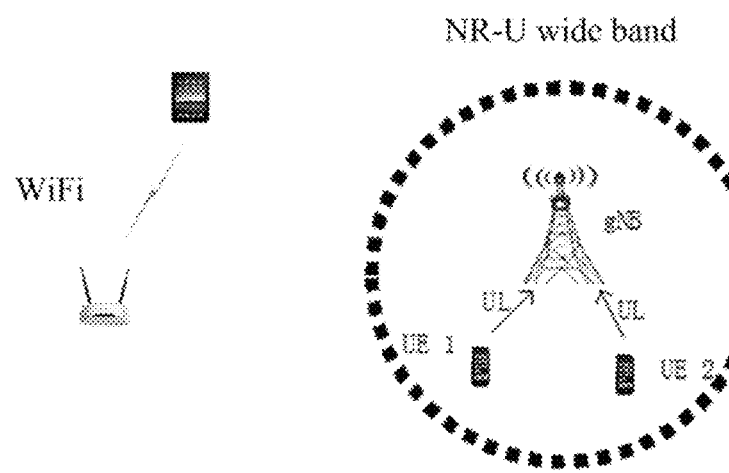
FIG. 2 shows a schematic diagram of uplink transmission in an NR-U wide band scenario.

For ease of understanding, FIG. 2 shows a schematic diagram of uplink transmission in an NR-U wide band scenario. In the example shown in FIG. 2, WiFi devices communicate on the same unlicensed frequency band with NR-U devices. Generally, communication between the WiFi devices and communication between the NR-U devices should not interfere with each other, which is guaranteed by the NR-U devices performing LBT before transmission as mentioned above. Since the wideband of NR-U for uplink transmission includes multiple sub-bands, a technical solution of frequency-hopping transmission is proposed according to the embodiment, to make full use of the multiple sub-bands and provide flexible uplink transmission solutions for different quality of service (QoS) requirements. It should be understood that FIG. 2 only shows an example of an application scenario, which is not limiting. Moreover, the technical solution in the embodiment can further provide advantages other than the above-mentioned advantages.

Figure 3:
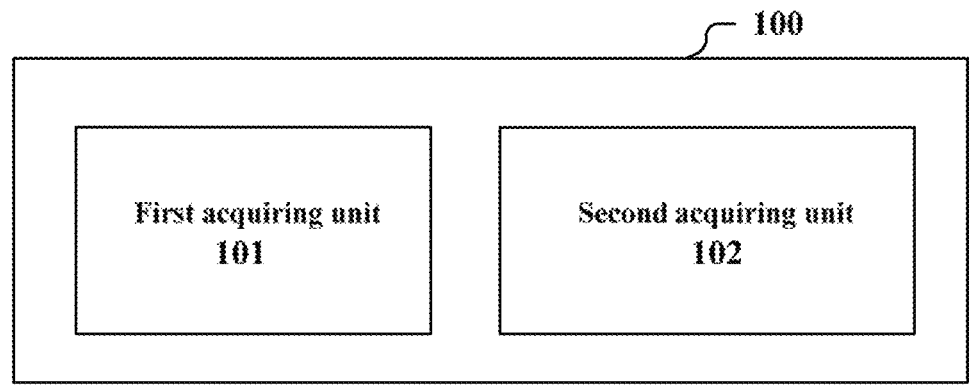
FIG. 3 shows a block diagram of functional modules of an electronic apparatus for wireless communications according to an embodiment of the present disclosure.

FIG. 3 shows a block diagram of functional modules of an electronic apparatus 100 for wireless communications according to an embodiment of the present disclosure. As shown in FIG. 3, the electronic apparatus 100 includes a first acquiring unit 101 and a second acquiring unit 102. The first acquiring unit 101 is configured to acquire an RRC signaling from a base station. The RRC signaling includes configuration information of a frequency-hopping operation for uplink transmission in wide band of a UE on an unlicensed frequency band, wherein the UE switches among multiple sub-bands in the wide band to perform the uplink transmission by the frequency-hopping operation. The second acquiring unit 102 is configured to acquire DCI from the base station. The DCI includes activation information for the frequency-hopping operation.

The first acquiring unit 101 and the second acquiring unit 102 may be implemented by one or more processing circuitries, and the processing circuitry, for example, may be implemented as a chip or a processor. Moreover, it should be understood that the functional units in the electronic apparatus shown in FIG. 3 are only logical modules divided based on their specific functions, and are not intended to limit a specific implementation.

The electronic apparatus 100, for example, may be arranged on a UE side or may be communicatively connected to a UE. It should be further noted that the electronic apparatus 100 may be implemented at a chip level or at a device level. For example, the electronic apparatus 100 may operate as a UE itself, and may include external devices such as a memory and a transceiver (not shown in FIG. 3). The memory may store programs and related data information for implementing various functions by the user equipment. The transceiver may include one or more communication interfaces to support communications with different devices (for example, a base station, another UE and the like). The implementation of the transceiver is not limited herein.

The UE performs the frequency-hopping operation among multiple sub-bands in the wideband when performing the uplink transmission, improving the reliability of data transmission, and improving the success probability of the LBT due to making use of the diversity gain of the multiple sub-bands, thereby transmitting data more timely and reducing the latency.

The first acquiring unit 101 acquires, from the base station, configuration information for the frequency-hopping operation. The information may be included in the RRC signaling. Exemplarily, the RRC signaling is a periodic semi-persistent scheduling (SPS) RRC signaling. Alternatively, the RRC signaling is a periodic configured grant scheduling RRC signaling.

The UE continuously detects a physical downlink control channel (PDCCH). The second acquiring unit 102 acquires an activation indication for the frequency-hopping operation from the DCI in the detected PDCCH for the UE. The UE performs the frequency-hopping operation based on the activation indication.

For example, the configuration information may include information about a frequency-hopping mode and/or information about a frequency-hopping rule. In other words, The configuration information is used for configuring under what conditions the frequency-hopping operation is performed and/or how to perform the frequency-hopping operation. The activation information may include indication information of a frequency-hopping mode to be activated and/or indication information of a frequency-hopping rule to be applied. For example, in a case that the frequency-hopping mode is unique, the configuration information may not include the information about the frequency-hopping mode, and the activation information may not include the information of the frequency-hopping mode to be activated, which is agreed by default by the base station and the UE. Similarly, in a case that the frequency-hopping rule is unique, the configuration information may not include the information about the frequency-hopping rule, and the activation information may not include the information of the frequency-hopping rule to be applied, which is agreed by default by the base station and the UE.

Further, in a specific example, the base station and the UE may agree to adopt a fixed frequency-hopping mode and a fixed frequency-hopping rule by default, instead of configuring through the RRC signaling and indicating through the DCI.

In an example, the frequency-hopping mode may include one or more of: a first frequency-hopping mode in which the UE performs the frequency-hopping operation among multiple consecutive channel occupation times (OCTs), a second frequency-hopping mode in which the UE performs the frequency-hopping operation among multiple uplink transmission sections within one COT, and a third frequency-hopping mode in which the UE performs the frequency-hopping operation among periodic uplink transmissions of configured grant scheduling.

Figure 4:
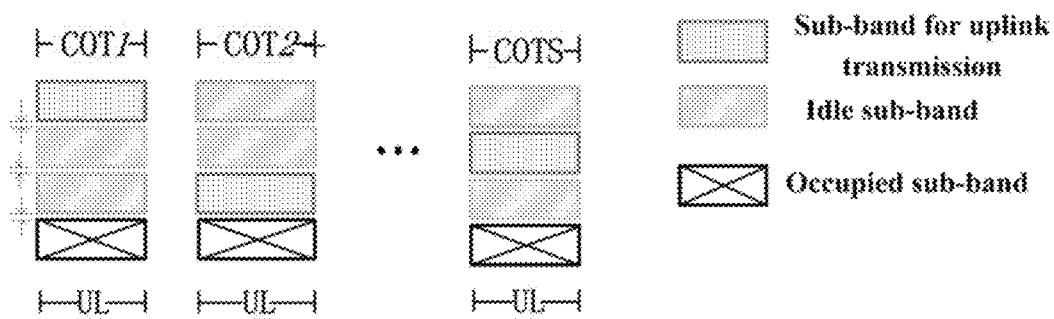
FIG. 4 shows a schematic diagram of frequency-hopping operations in a first frequency-hopping mode.

FIG. 4 shows a schematic diagram of frequency-hopping operations in a first frequency-hopping mode. In FIG. 4, the UE performs a frequency-hopping operation between every two adjacent COTs among S consecutive COTs (COT 1 to COT S shown in FIG. 4). In the example shown FIG. 4, it is assumed that one carrier has a bandwidth of 80 MHz and is divided into 4 sub-bands, each of the sub-bands has a bandwidth of 20 MHz, and the UE may perform LBT for each of the sub-bands respectively. As shown in FIG. 4, in COT 1, the UE performs uplink (UL) transmission on a first sub-band; in COT 2, the UE performs a frequency-hopping operation to switch to a third sub-band to perform uplink transmission; in COT S, the UE performs a frequency-hopping operation to switch to a second sub-band to perform uplink transmission. It should be noted that before performing frequency-hopping operation, the UE performs LBT on the sub-band to be switched to for determining that the sub-band is available.

Accordingly, the information about the first frequency-hopping mode in the configuration information may include the number of multiple consecutive COTs, such as a value of S as mentioned above. Frequency-hopping transmission is performed among multiple consecutive COTs, effectively resisting frequency-selective fading of the sub-bands, and mitigating the impact of LBT failures.

Figure 5:
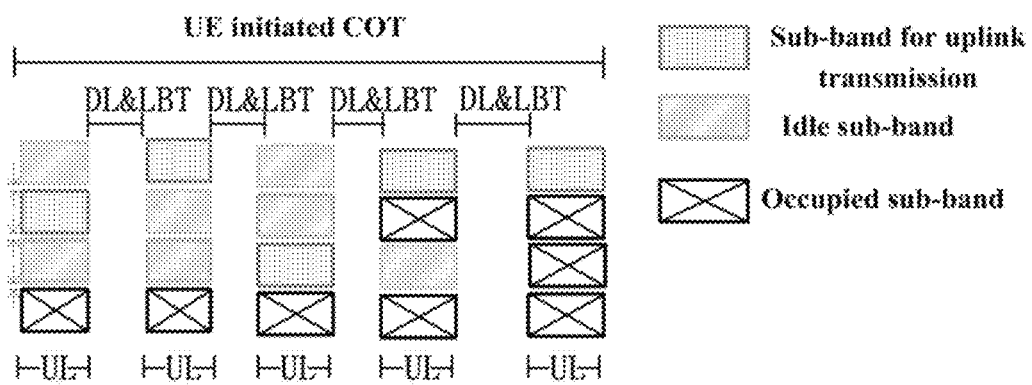
FIG. 5 shows a schematic diagram of frequency-hopping operations in a second frequency-hopping mode.

FIG. 5 shows a schematic diagram of frequency-hopping operations in a second frequency-hopping mode. In FIG. 5, The UE initiates one COT, in which there may be multiple uplink transmission sections separated by downlink (DL) transmissions of a gNB. That is, there are multiple uplink and downlink transition points within one COT. Among these uplink transmission sections, the UE may perform frequency-hopping operations. As shown in FIG. 5, in a first uplink transmission section, the UE performs uplink transmission on a second sub-band; in a second uplink transmission section, the UE performs a frequency-hopping operation to switch to a first sub-band to perform uplink transmission; in a third uplink transmission section, the UE performs a frequency-hopping operation to switch to a third sub-band to perform uplink transmission; in a fourth uplink transmission section and a fifth uplink transmission section, the UE performs a frequency-hopping operation to switch to a first sub-band to perform the uplink transmission. Similarly, before performing the frequency-hopping operation, the UE also performs LBT on the sub-band to be switched to for determining that the sub-band is available. FIG. 5 shows an example in which there are five uplink transmission sections within one COT, which is not limiting. The number of uplink transmission sections within one COT depends on the actual transmission situation of the UE.

Frequency-hopping transmission is performed among multiple uplink transmission sections within a single COT, effectively avoiding disadvantages caused by preempting sub-bands by other devices due to switching between uplink and downlink in a single COT, thereby enabling the available sub-bands to be found more quickly for transmission and reducing the latency.

Figure 6:
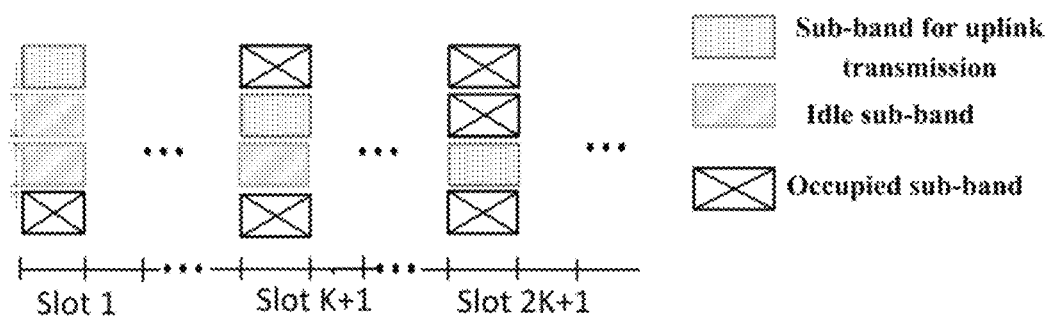
FIG. 6 shows a schematic diagram of frequency-hopping operations in a third frequency-hopping mode.

FIG. 6 shows a schematic diagram of frequency-hopping operations in a third frequency-hopping mode. In a configured grant scheduling, the UE may periodically perform uplink transmissions to the gNB, and in the third frequency-hopping mode, the UE may perform a frequency-hopping operation among the periodic uplink transmissions. As shown in FIG. 6, the UE performs uplink transmission of configured grant scheduling every K time slots, where each uplink transmission may occupy one or more time slots (one time slot is occupied shown in FIG. 6). In time slot 1, the UE performs uplink transmission on a first sub-band; in time slot K+1, the UE performs a frequency-hopping operation to switch to a second sub-band to perform uplink transmission; in time slot 2K+1, the UE performs a frequency-hopping operation to switch to a third sub-band to perform uplink transmission; and so on.

Accordingly, the information about the third frequency-hopping mode in the configuration information may include the number of interval time slots between adjacent uplink transmissions, such as the above K. In addition, the information about the third frequency-hopping mode may further include the number of frequency-hopping operations that can be performed (hereinafter also referred to as the number of survivals of frequency-hopping transmission). The number of frequency-hopping operations that can be performed refers to the maximum number of frequency-hopping operations that can be performed among periodic uplink transmissions of the configured grant scheduling.

By performing frequency-hopping transmission among periodic uplink transmissions of the configured grant scheduling, the advantages of multiple sub-bands can be better utilized, the impact of LBT failures and the latency can be reduced, improving the reliability of transmission.

The activation information may include indication information of a frequency-hopping mode to be activated, such as information for indicating which one of the first frequency-hopping mode, the second frequency-hopping mode and the third frequency-hopping mode is to be activated, or information for indicating whether to activate a certain frequency-hopping mode.

Exemplarily, the activation information may include a first field indicating whether to activate the first frequency-hopping mode and/or a second field indicating whether to activate the second frequency-hopping mode. For example, the first field is IsMultipleSlotsHopping, and the second field is IsMultipleULHoppingSigleCOT. In a case that the first field takes the value of 1, it indicates that the first frequency-hopping mode is to be activated; and in a case that the second field takes the value of 1, it indicates that the second frequency-hopping mode is to be activated. In addition, the first field and the second field may multiplex an existing frequency-hopping flag field, such as Frequency Hopping Flag, in the DCI. The first field and the second field may also be the same field, and different values indicate different frequency-hopping modes are to be activated. It should be understood that the above is merely an example of how to indicate the frequency-hopping mode to be activated, and is not limiting.

Based on the configuration and indication of multiple frequency-hopping modes, the uplink transmission scheme can be configured more flexibly to better meet different service requirements.

Hereinafter, an example of how to perform a frequency-hopping operation, that is, a frequency-hopping rule, is specifically described. For example, a frequency-hopping rule may be designed to enable the UE to find available sub-bands for transmission and to reduce the impact of frequency-selective fading as much as possible.

The frequency-hopping rule may include one or more of: a rule for determining which sub-band the UE is to be switched to when performing the frequency-hopping operation, and a rule for determining whether to perform the frequency-hopping operation. In addition, the frequency-hopping rule may further include processing for a situation in which a sub-band to which the UE is to be switch is occupied.

Exemplarily, the frequency-hopping rule may include one or more of: continuously performing the frequency-hopping operation, performing frequency-hopping operation once every predetermined number of frequency-hopping operation periods, randomly determining a sub-band to be switched to, and switching to a sub-band next to a sub-band used by the UE before the frequency-hopping operation is performed. The frequency-hopping operation period refers to a time interval between two frequency-hopping operations in each of the frequency-hopping modes. Specifically, for example, in the first frequency-hopping mode, the frequency-hopping operation period is one COT; in the second frequency-hopping mode, the frequency-hopping operation period is one uplink transmission section; and in the third frequency-hopping mode, the frequency-hopping operation period is a time interval between adjacent uplink transmissions.

For ease of understanding, specific examples of three frequency-hopping rules are provided below. It should be understood that these examples are not limiting.

According to a first frequency-hopping rule, the UE continuously performs frequency-hopping operations, that is, the UE performs a frequency-hopping operation between every two frequency-hopping operation periods. It is assumed that $f_n$ represents the number of a sub-band to which the UE is to be switched in an n-th frequency-hopping operation period (that, an n-th frequency-hopping operation), the first frequency-hopping rule may be expressed as:

$$f_n = (f_{n-1}+1) \bmod X, \text{ if rand}(1) > 1-\epsilon \tag{1}$$

$$f_n \lfloor X^* \text{rand}(1) \rfloor, \text{ if rand}(1) < \epsilon \tag{2}$$

where X represents the total number of optional sub-bands, ϵ represents a sub-band selection resetting probability, and the rand(1) function returns a value ranging from 0 to 1 with a uniform probability. It can be seen from equation (1) that, if rand(1)>1−ϵ, the UE will frequency hop to a sub-band next to a sub-band previously used by the UE. It can be seen from equation (2) that, if rand(1)<ϵ, the UE will randomly switch to a sub-band. Furthermore, in a case that LBT results for the $f_n$ sub-bands fail, the UE continuously applies the first frequency-hopping rule to attempt to switch to a next sub-band or another sub-band which is randomly determined.

By using the first frequency-hopping rule, each of the sub-bands can be selected with equal probability, and sub-band resetting is possible to be realized.

According to a second frequency-hopping rule, the UE performs one frequency-hopping operation every T frequency-hopping operation periods. It is assumed that $g_n$ represents the number of a sub-band to which the UE is to be switched to in an n-th frequency-hopping operation period, the second frequency-hopping rule may be expressed as:

$$g_{nT+x} = g_{nT+1}, 2 \leq x \leq T, n \geq 0 \quad (3)$$

$$g_{(n+1)T+1} = (g_{nT+1}+1) \bmod X, n \geq 0 \quad (4)$$

where X represents the total number of optional sub-bands, and T represents the number of frequency-hopping operation periods between two adjacent frequency-hopping operations. It can be seen from equation (3) that one frequency-hopping operation is performed every T frequency-hopping operation periods. It can be seen from equation (4) that in performing the frequency-hopping operation, the UE switches to a sub-band next to a sub-band used by the UE before the frequency-hopping operation is performed.

By using the second frequency-hopping rule, the frequency of the frequency-hopping occurrence can be controlled, thereby ensuring that frequency-hopping does not occur frequently. By adjusting T, the frequency of the frequency-hopping operation can be adjusted for different channel change rates, thereby improving the reliability of data transmission.

According to a third frequency-hopping rule, the UE performs one frequency-hopping operation every T frequency-hopping operation periods. It is assumed that $h_n$ represents the number of a sub-band to which the UE is to be switched in an n-th frequency-hopping operation period, the third frequency-hopping rule may be expressed as:

$$h_{nT+x} = h_{nT+1}, 2 \leq x \leq T, n \geq 0 \quad (5)$$

$$h_{(n+1)T+1} = \lfloor X^* \text{rand} \rfloor, n \geq 0 \quad (6)$$

where X represents the total number of optional sub-bands, and T represents the number of frequency-hopping operation periods between two adjacent frequency-hopping operations. It can be seen from equation (5) that one frequency-hopping operation is performed every T frequency-hopping operation periods. It can be seen from equation (6) that in performing the frequency-hopping operation, the UE switches to a randomly determined sub-band.

Similarly, by using the third frequency-hopping rule, the frequency of the frequency-hopping occurrence can be controlled, thereby ensuring that frequency-hopping does not occur frequently. By adjusting T, the frequency of the frequency-hopping operation can be adjusted for different channel change rates, thereby improving the reliability of data transmission.

Which frequency-hopping rule is to be used by the UE may be configured by an RRC signaling, or may be indicated by DCI. Alternatively, the base station and the UE may agree to use a specific frequency-hopping rule by default, which is not limiting.

Figure 7:
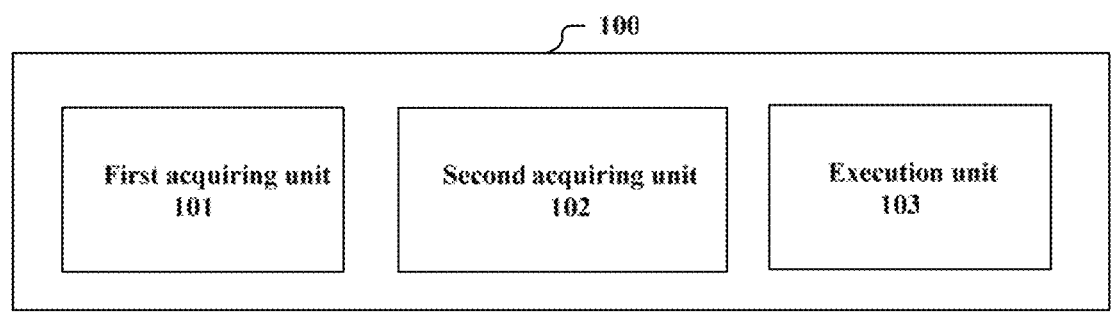
FIG. 7 shows a block diagram of functional modules of an electronic apparatus for wireless communications according to an embodiment of the present disclosure.

As shown in FIG. 7, the electronic apparatus 100 further includes an execution unit 103. The execution unit 103 is configured to perform the frequency-hopping operation on a sub-band on which the uplink transmission is performed in response to the acquired DCI, for example, perform the frequency-hopping operation in a frequency-hopping mode indicated in the DCI and according to a frequency-hopping rule indicated in the DCI. In a case that the UE is to perform the frequency-hopping operation on multiple sub-bands, the execution unit 103 performs the frequency-hopping operation on each of the multiple sub-bands, if a post-hopping sub-band collision occurs in two or more sub-bands among the multiple sub-bands, the frequency-hopping operation is performed again on the two or more sub-bands involved in the post-hopping sub-band collision until the post-hopping sub-band collision does not occur. In a case that the multiple sub-bands are adjacent to each other, the execution unit 103 may perform the frequency-hopping operation by taking the multiple sub-bands as one sub-band.

In addition, in order to minimize fragmentation of remaining spectrum after the UE selects a sub-band for transmission and to utilize a guard band between sub-bands, a sub-band optimization mode may be adopted. In the sub-band optimization mode, the UE (specifically, for example, the execution unit 103) selects a sub-band to be used for uplink transmission to perform channel idle detection (such as LBT) to reduce fragmentation of the sub-bands. In this way, the utilization efficiency of the guard band between the sub-bands can be improved. The DCI acquired by the second acquiring unit 102 may further include an indication indicating whether to activate the sub-band optimization mode.

Figure 8:
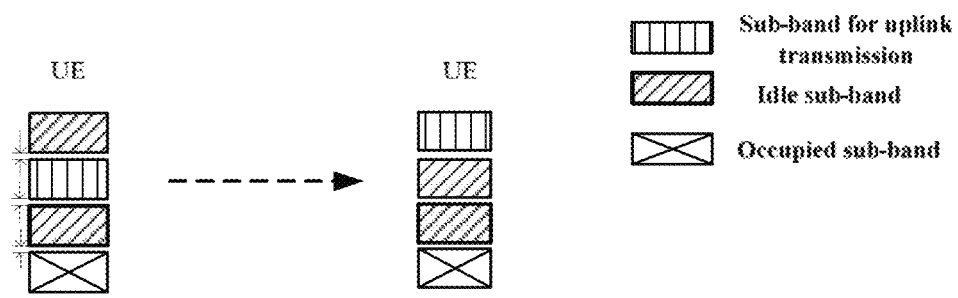
FIG. 8 shows a schematic example of sub-band optimization selection.

FIG. 8 shows a schematic example of the sub-band optimization selection. As shown in FIG. 8, the UE performs transmission on a middle sub-band at the beginning, and the UE performs LBT on an edge sub-band for a next transmission to avoid fragmentation of spectrum. In this way, if the LBT is successful, the UE occupies the edge sub-band, so that the two middle sub-bands may be joined together to be used by other UEs, thereby utilizing the guard band between the two sub-bands.

The sub-band optimization selection by the UE may be affected by impact between the UE and another UE. For example, in the sub-band optimization mode, the execution unit 103 is further configured to select the sub-band based on the distance between the UE and another UE.

In a case that the distance between the UE (referred to as UE1) and another UE (referred to as UE2) is near, such as smaller than a predetermined threshold, when the UE1 uses a sub-band, the UE2 will detect that the sub-band is occupied. Therefore, the result of the UE1 selecting a sub-band for LBT will affect the UE2. In a case that the distance between the UE1 and the UE2 is far, such as greater than a predetermined threshold, the sub-band selection by the UE1 does not affect the selection by the UE2, and the utilization of the sub-bands by the UE1 and the UE2 may be completely decoupled.

Figure 9:
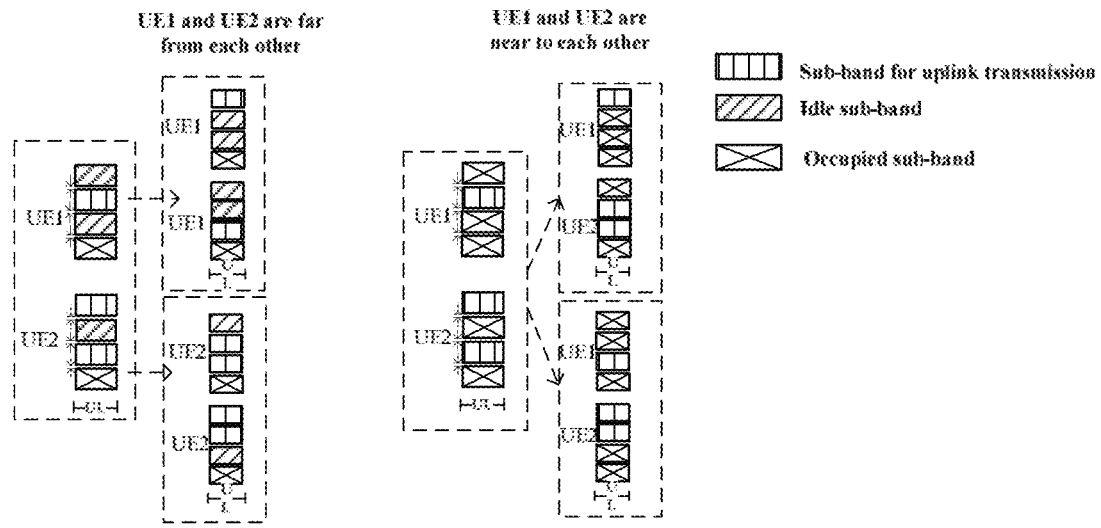
FIG. 9 shows a schematic diagram of sub-band selections by UE1 and UE2 in a sub-band optimization mode in cases that distances between UE1 and UE2 are different (near or far)

FIG. 9 shows a schematic diagram of sub-band selections by UE1 and UE2 in a sub-band optimization mode in cases of different distances (near or far) between the UE1 and the UE2. As shown in FIG. 9, the UE1 is to use one sub-band, and the UE2 is to use two sub-bands. In a case that the two UEs are far apart from each other, the UE1 has two optimal selections, that is, excluding a fourth sub-band which has been occupied, the UE1 may select a first sub-band or a third sub-band. The UE2 may freely choose a combination of the first sub-band and a second sub-band, or a combination of the second sub-band and the third sub-band. In a case that two UEs are near to each other, if the UE1 selects a first sub-band, the UE2 may only select a combination of a second sub-band and a third sub-band; and if the UE1 selects the third sub-band, the UE2 may only select a combination of the first sub-band and the second sub-band. Therefore, the sub-band selections by the UE1 and the UE2 are mutually constrained.

Exemplarily, the second acquiring unit 102 is further configured to acquire, from the base station, information about the distance. For example, the information about the distance may be a value of the actual distance provided by the base station, and the UE determines that the distance between the UE and the other UE is far or near based on the value of the distance. Alternatively, the information about the distance may include information indicating whether the distance is near or far. The execution unit 103 is configured, in a case that the information about the distance indicates that the distance is near, to select the sub-band taking sub-band selection by the other UE into consideration. On the contrary, in a case that the information about the distance indicates that the distance is far, the execution unit 103 selects the sub-band without considering sub-band selection by the other UE.

For example, the distance between the UE1 and the UE2 being near or far may be estimated based on a degree of interferences between the UE1 and the UE2. In a case that the interferences between the UE1 and the UE2 are strong, it is determined that the distance between the UE1 and the UE2 is near; and otherwise, it is determined that the distance between the UE1 and the UE2 is far. For example, the interferences may be represented by a signal to interference and noise ratio (SINR) of the UE. Exemplarily, in a case that an SINR of the UE1 is less than a threshold due to the interferences of the UE2 to the UE1, it is determined that the distance between the UE1 and the UE2 is near.

It is assumed that the distance between the UE1 and the UE2 is represented by $d_1^2$, interferences $I_1^2$ are produced, as shown in the following equation (7), and the receiving SINR$_1^2$ of the UE1 is as shown in the following equation (8). In a case that $SINR_1^2 < SINR_{th}$ due to $d_1^2$, it is determined that the UE1 is near to the UE2. In the equation (7), $P_{Tx}$ represents a transmitting power of the UE2, $G_{Tx}$ represents an antenna gain, $\lambda$ and $\alpha$ represent constants. In the equation (8), $P_{Rx}$ represents a receiving power of the UE1, and $N_0$ represents a white-noise power.

$$I_1^2 = P_{Tx} \cdot G_{Tx} \cdot \left(\frac{\lambda}{4\pi d_1^2}\right)^\alpha \quad (7)$$

$$SINR_1^2 = \frac{P_{Rx}}{I_1^2 + N_0} \quad (8)$$

Figure 10:
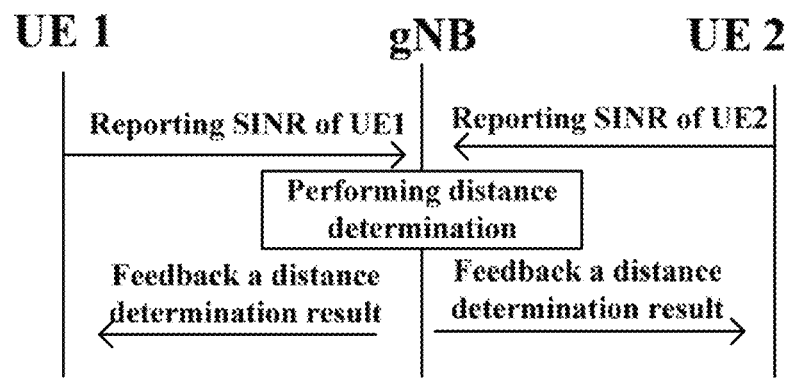
FIG. 10 shows a schematic diagram of an information procedure of processing related to distance relationship determining.

In an example, the execution unit 103 is further configured to report an SINR of the UE to the base station, so that the base station determines the information of the distances between the UE and the other UE based on the SINR of each of UEs. For example, the base station compares the reported SINR with a set threshold to determine a distance relationship between two UEs, and provides a determination result to the UE. FIG. 10 shows a schematic diagram of the information procedure of the related processing. In the FIG. 10, the gNB may estimate the threshold for determination based on the equations (7) and (8).

In summary, with the electronic apparatus 100 according to the present embodiment, the frequency-hopping technology can be adopted in the uplink wideband transmission on the unlicensed frequency band, so that the uplink transmission can be switched among multiple sub-bands, improving the reliability of the uplink transmission and effectively reducing the latency. In addition, with the electronic apparatus 100, the sub-band is selected in the sub-band optimization mode, reducing fragmentation of spectrum, improving the utilization rate of the guard bands between the sub-bands, thereby improving the utilization efficiency of the spectrum.

Figure 11:
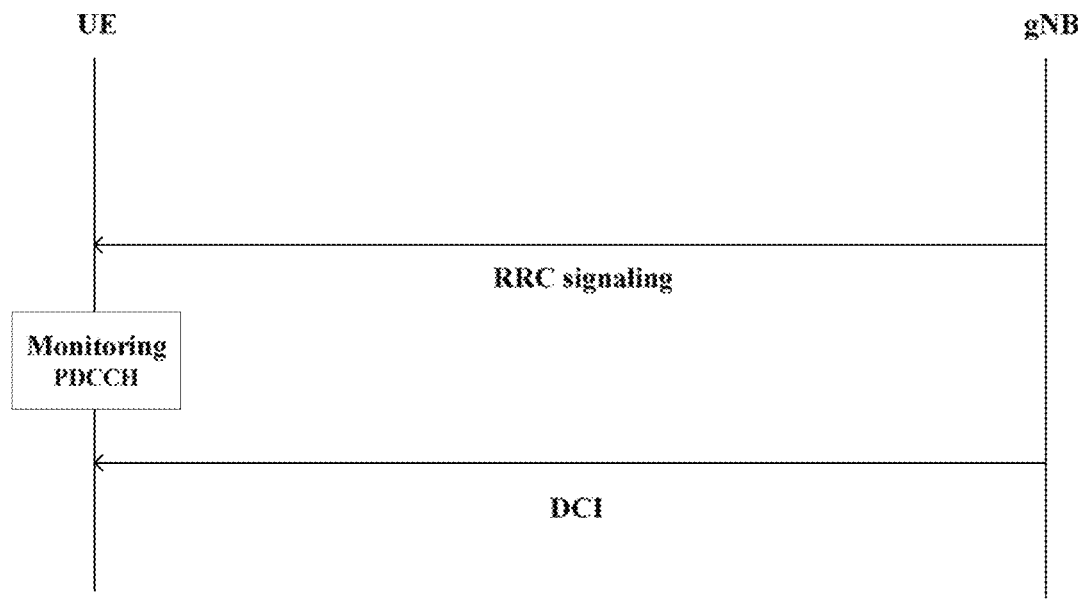
FIG. 11 shows a schematic diagram of an example of an information procedure between a base station and a UE.

For ease of understanding, FIG. 11 shows a schematic diagram of an example of an information procedure between a base station and a UE. The gNB provides the UE with configuration information for the frequency-hopping operation through an RRC signaling. As mentioned above, the configuration information may include, for example, one or more of: the number S of the COTs in which the UE performs the frequency-hopping operation consecutively, the frequency-hopping rule of the UE in the S consecutive COTs, the frequency-hopping rule of the UE in multiple uplink transmission sections in a single COT, the number K of interval time slots between adjacent uplink transmissions in configured grant scheduling, the number M of times of survivals of the frequency-hopping operation in the configured grant scheduling, and the frequency-hopping rule for the frequency-hopping operation in the configured grant scheduling. Then, the UE continuously monitors the PDCCH. The gNB transmits the PDCCH. The DCI of the PDCCH includes control information for uplink scheduling, which includes activation information (indication information) for the frequency-hopping operation. Exemplarily, the activation information includes one or more of: IsMultipleSlotsHopping for indicating whether the UE performs the frequency-hopping operation in S consecutive COTs, IsMultipleULHoppingSigleCOT for indicating whether the UE perform the frequency-hopping operation in multiple uplink transmission sections in a single COT, and IsSubbandSelectOpt for indicating whether to activate the sub-band optimization mode. IsMultipleSlotsHopping and IsMultipleULHoppingSigleCOT may multiplex the Frequency Hopping Flag in the DCI.

It should be understood that the information procedure described above is only an example, and in practical applications, adjustments may be made according to requirements, such as adding or removing information items.

Second Embodiment

Figure 12:
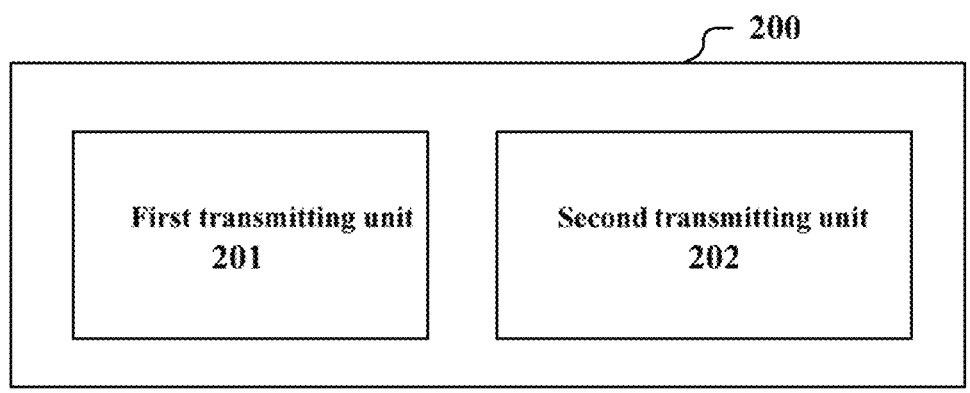
FIG. 12 shows a block diagram of functional modules of an electronic apparatus for wireless communications according to another embodiment of the present disclosure.

FIG. 12 shows a block diagram of functional modules of an electronic apparatus 200 according to another embodiment of the present disclosure. As shown in FIG. 12, the electronic apparatus 200 includes a first transmitting unit 201 and a second transmitting unit 202. The first transmitting unit 201 is configured to transmit an RRC signaling to a UE. The RRC signaling includes configuration information of a frequency-hopping operation for uplink transmission in wide band of a UE on an unlicensed frequency band, wherein the user equipment switches among multiple sub-bands in the wide band to perform the uplink transmission by the frequency-hopping operation. The second transmitting unit 202 is configured to transmit DCI to the UE. The DCI includes activation information for the frequency-hopping operation.

The first transmitting unit 101 and the second transmitting unit 102 may be implemented by one or more processing circuitries. The processing circuitry, for example, may be implemented as a chip or a processor. Moreover, it should be understood that the functional units in the electronic apparatus shown in FIG. 12 are only logical modules divided based on their specific functions, and are not intended to limit a specific implementation, which also applies to the examples of other electronic apparatus to be described below.

The electronic apparatus 200, for example, may be arranged on a base station side or may be communicatively connected to a base station. The base station described in the present disclosure may be a Transmit Receive Point (TRP) or an Access Point (AP). It should be further noted that the electronic apparatus 200 may be implemented at a chip level or a device level. For example, the electronic apparatus 200 may function as a base station itself, and may include an external device such as a memory and a transceiver (not shown in FIG. 12). The memory may store programs and related data information for implementing various functions by the base station. The transceiver may include one or more communication interfaces to support communications with different devices (for example, a UE, other base stations and the like). The implementation of the transceiver is not limited herein.

As mentioned above, the UE performs the frequency-hopping operation among multiple sub-bands in the wideband in performing the uplink transmission, improving the reliability of data transmission, improving the success probability of the LBT due to making use of the diversity gain of the multiple sub-bands, thereby transmitting data more timely and reducing the latency. The electronic apparatus 200 in this embodiment is configured to configure and indicate the frequency-hopping operation of the UE.

The first transmitting unit 201 transmits, to the UE, configuration information of the frequency-hopping operation through an RRC signaling. Exemplarily, the RRC signaling is a periodic semi-persistent scheduling RRC signaling. Alternatively, the RRC signaling is a periodic configured grant scheduling RRC signaling. The second transmitting unit 202 transmits, to the UE, activation information of the frequency-hopping operation through DCI, so that the UE performs the frequency-hopping operation based on the activation information.

For example, the configuration information may include information about a frequency-hopping mode and/or information about a frequency-hopping rule. In other words, the configuration information is used for configuring under what conditions the frequency-hopping operation is performed and/or how to perform the frequency-hopping operation. The activation information may include indication information of a frequency-hopping mode to be activated and/or indication information of a frequency-hopping rule to be applied.

In an example, the frequency-hopping mode may include one or more of: a first frequency-hopping mode in which the UE performs the frequency-hopping operation among multiple consecutive OCTs, a second frequency-hopping mode in which the UE performs the frequency-hopping operation among multiple uplink transmission sections within one COT, and a third frequency-hopping mode in which the UE performs the frequency-hopping operation among periodic uplink transmissions of configured grant scheduling. The first frequency-hopping mode, the second frequency-hopping mode and the third frequency-hopping mode have been described specifically in the first embodiment with reference to FIGS. 4 to 6, and are not described again herein.

Accordingly, the information about the frequency-hopping mode in the configuration information may include one or more of: the number of multiple consecutive COTs, the number of interval time slots between adjacent uplink transmissions in the third frequency-hopping mode, and the number of frequency-hopping operations that can be performed in the third frequency-hopping mode.

Similarly, the activation information may include indication information of a frequency-hopping mode to be activated, such as information for indicating which one of the first frequency-hopping mode, the second frequency-hopping mode and the third frequency-hopping mode is to be activated, or information for indicating whether to activate a certain frequency-hopping mode.

Exemplarily, the activation information may include a first field indicating whether to activate the first frequency-hopping mode and/or a second field indicating whether to activate the second frequency-hopping mode. For example, the first field is IsMultipleSlotsHopping, and the second field is IsMultipleULHoppingSigleCOT. In a case that the first field takes the value of 1, it indicates that the first frequency-hopping mode is to be activated; and in a case that the second field takes the value of 1, it indicates that the second frequency-hopping mode is to be activated. In addition, the first field and the second field may multiplex an existing frequency-hopping flag field, such as Frequency Hopping Flag, in the DCI. The first field and the second field may be the same field, and different values indicate that different frequency-hopping modes are to be activated. It should be understood that the above is merely an example of how to indicate the frequency-hopping mode to be activated, and is not limiting.

Based on the configuration and indication of multiple frequency-hopping modes, the uplink transmission scheme can be configured flexibly to meet different service requirements.

The UE may perform the frequency-hopping operation by adopting one of the multiple frequency-hopping rules. Therefore, the configuration information may configure multiple frequency-hopping rules for the UE. For example, a frequency-hopping rule may be designed to enable the UE to find an available sub-band for transmission and to reduce the impact of frequency-selective fading.

In one example, the frequency-hopping rule may include one or more of: a rule for determining which sub-band the UE is to be switched to when performing the frequency-hopping operation, and a rule for determining whether to perform the frequency-hopping operation. In addition, the frequency-hopping rule may further include processing for a situation in which a sub-band to which the UE is to be switched is occupied. The processing includes, for example, performing the frequency-hopping operation again according to the frequency-hopping rule until the sub-band which is switched to is available.

Exemplarily, the frequency-hopping rule may include one or more of: continuously performing the frequency-hopping operation, performing frequency-hopping operation once every predetermined number of frequency-hopping operation periods, randomly determining a sub-band to be switched to, and switching to a sub-band next to a sub-band used by the UE before the frequency-hopping operation is performed. The frequency-hopping operation period refers to a time interval between two frequency-hopping operations in each of the frequency-hopping modes. Specifically, for example, in the first frequency-hopping mode, the frequency-hopping operation period is one COT; in the second frequency-hopping mode, the frequency-hopping operation period is one uplink transmission section; and in the third frequency-hopping mode, the frequency-hopping operation period is a time interval between adjacent uplink transmissions.

Specific examples of the three frequency-hopping rules have been provided in the first embodiment, and are not repeated herein. The gNB may configure the frequency-hopping rule for the UE through an RRC signaling, and may dynamically indicate the frequency-hopping rule to the UE through DCI, which are not limiting.

In addition, the DCI may further include an indication indicating whether to activate a sub-band optimization mode. In the sub-band optimization mode, the UE selects a sub-band to be used for uplink transmission to perform channel idle detection (such as LBT) to reduce fragmentation of the sub-bands. In addition, by using the sub-band optimization mode, guard bands between sub-bands can be utilized, thereby improving the utilization efficiency of the guard bands between the sub-bands.

As described in the first embodiment, the sub-band optimal selection by the UE may be affected by the impact between the UE and another UE. Therefore, in the sub-band optimization mode, the UE can select the sub-band based on the distance between the UE and the other UE. In this embodiment, the second transmitting unit 202 provides the UE with information about the distance between the UE and the other UE. For example, the information about the distance may be values of the actual distance. Alternatively, the information about the distance includes information indicating whether the distance is near or far. In a case that the information about the distance indicates that the distance is near, the UE selects the sub-band taking the sub-band selection by the other UE into consideration. A specific example, for example, is shown in FIG. 9.

The electronic apparatus 200 may acquire, from each of the UEs, an SINR of the UE, and determine the information about the distance between the UE and another UE based on the SINR of each of the UEs.

In summary, with the electronic apparatus 200 according to the embodiments of the present embodiment, the frequency-hopping technology is adopted by the UE in the uplink wideband transmission on the unlicensed frequency band, so that the uplink transmission can be switched among multiple sub-bands, improving the reliability of the uplink transmission and effectively reducing the latency. In addition, with the electronic apparatus 200, the UE can select a sub-band in the sub-band optimization mode, reducing fragmentation of spectrum, improving the utilization rate of the guard bands between the sub-bands, thereby improving the utilization efficiency of the spectrum.

Third Embodiment

In the above description of embodiments of the electronic apparatuses for wireless communications, it is apparent that some processing and methods are further disclosed. In the following, a summary of the methods is described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 13:
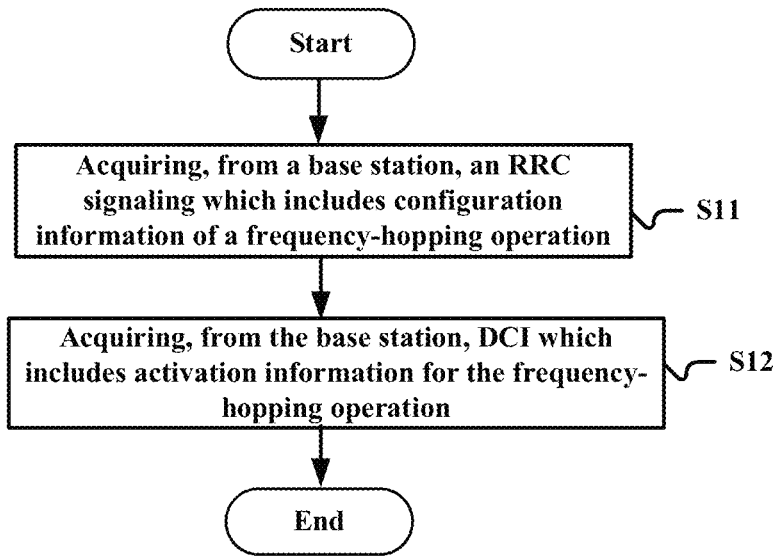
FIG. 13 shows a flowchart of a method for wireless communications according to an embodiment of the present disclosure.

FIG. 13 shows a flowchart of a method for wireless communications according to an embodiment of the present disclosure. The method includes: acquiring, from a base station, an RRC signaling (S11) which includes configuration information of a frequency-hopping operation for uplink transmission in wide band of a UE on an unlicensed frequency band, wherein the UE switches among multiple sub-bands in the wide band to perform the uplink transmission by the frequency-hopping operation; and acquiring, from the base station, DCI (S12) which includes activation information for the frequency-hopping operation. The method, for example, is performed on the UE side.

For example, the configuration information includes information about a frequency-hopping mode and/or information about a frequency-hopping rule. The activation information includes indication information of a frequency-hopping mode to be activated and/or indication information of a frequency-hopping rule to be applied. The RRC signaling is a periodic semi-persistent scheduling RRC signaling.

Exemplarily, the frequency-hopping mode may include one or more of: a first frequency-hopping mode in which the UE performs the frequency-hopping operation among multiple consecutive COTs, a second frequency-hopping mode in which the UE performs the frequency-hopping operation among multiple uplink transmission sections within one COT, and a third frequency-hopping mode in which the UE performs the frequency-hopping operation among periodic uplink transmissions of configured grant scheduling.

The information about the frequency-hopping mode includes one or more of: the number of the multiple consecutive COTs, the number of interval time slots between adjacent uplink transmissions in the third frequency-hopping mode, and the number of frequency-hopping operations that can be performed in the third frequency-hopping mode.

The activation information includes, for example, a first field indicating whether to activate the first frequency-hopping mode and/or a second field indicating whether to activate the second frequency-hopping mode. The first field and the second field multiplex an existing frequency-hopping flag field in the DCI.

The frequency-hopping rule includes, for example, one or more of: a rule for determining which sub-band the UE is to be switched to when performing the frequency-hopping operation, and a rule for determining whether to perform the frequency-hopping operation. The frequency-hopping rule may further include processing for a situation in which a sub-band to which the UE is to be switched is occupied.

Exemplarily, the frequency-hopping rule includes one or more of: continuously performing the frequency-hopping operation, performing the frequency-hopping operation once every predetermined number of frequency-hopping operation periods, randomly determining a sub-band to be switched to, and switching to a sub-band next to a sub-band used by the UE before the frequency-hopping operation is performed.

Although not shown in FIG. 13, the above method further includes: performing the frequency-hopping operation on a sub-band on which the uplink transmission is performed in response to the DCI. In a case that the UE is to perform the frequency-hopping operation on multiple sub-bands, the frequency-hopping operation can be performed on each of the multiple sub-bands, and if a post-hopping sub-band collision occurs in two or more sub-bands among the multiple sub-bands, the frequency-hopping operation is performed again on the two or more sub-bands involved in the post-hopping sub-band collision until the post-hopping sub-band collision does not occur. In a case that the multiple sub-bands are adjacent to each other, the frequency-hopping operation may be performed by taking the multiple sub-bands as one sub-band.

In addition, the DCI may further include an indication indicating whether to activate a sub-band optimization mode in which the UE selects a sub-band to be used for uplink transmission to perform channel idle detection on the selected sub-band to reduce fragmentation of the sub-bands. For example, in the sub-band optimization mode, the sub-band may be selected based on a distance between the UE and another UE.

For example, the method further includes: acquiring, from the base station, information about the distance. The information about the distance may include information indicating whether the distance is near or far, and in a case that the information about the distance includes information indicating that the distance is near, the sub-band is selected by taking sub-band selection by another UE into consideration.

The method further includes: reporting an SINR of the UE to the base station, so that the base station determines the information about the distance between the UE and another UE based on the SINR of each of UEs.

Figure 14:
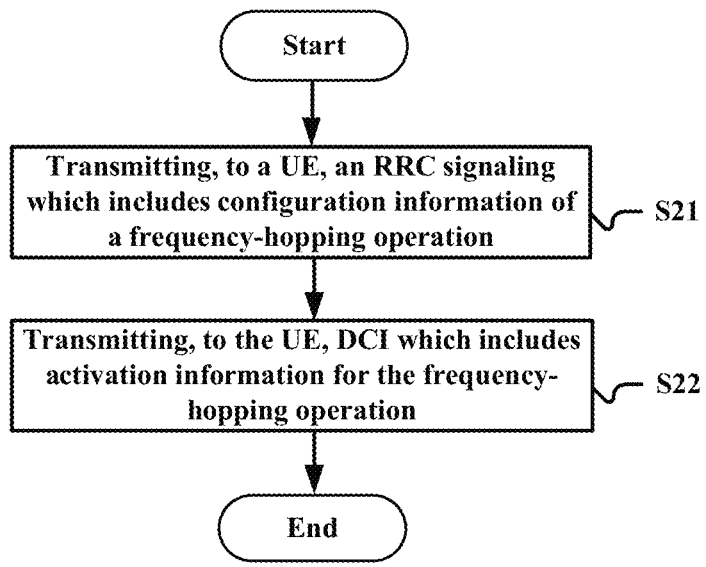
FIG. 14 shows a flowchart of a method for wireless communications according to another embodiment of the present disclosure.

FIG. 14 shows a flowchart of a method for wireless communications according to another embodiment of the present disclosure. The method includes: transmitting, to a UE, an RRC signaling (S21) which includes configuration information of a frequency-hopping operation for uplink transmission in wide band of a UE on an unlicensed frequency band, wherein the UE switches among multiple sub-bands in the wide band to perform the uplink transmission by the frequency-hopping operation; and transmitting, to the UE, DCI (S22) which includes activation information for the frequency-hopping operation. The method, for example, is performed on a base station side.

For example, the RRC signaling is a periodic semi-persistent scheduling RRC signaling. For example, the configuration information includes information about a frequency-hopping mode and/or information about a frequency-hopping rule. The activation information includes indication information of a frequency-hopping mode to be activated and/or indication information of a frequency-hopping rule to be applied.

Exemplarily, the frequency-hopping mode may include one or more of: a first frequency-hopping mode in which the UE performs the frequency-hopping operation among multiple consecutive COTs, a second frequency-hopping mode in which the UE performs the frequency-hopping operation among multiple uplink transmission sections within one COT, and a third frequency-hopping mode in which the UE performs the frequency-hopping operation among periodic uplink transmissions of configured grant scheduling.

The information about the frequency-hopping mode includes one or more of: the number of the multiple consecutive COTs, the number of interval time slots between adjacent uplink transmissions in the third frequency-hopping mode, and the number of frequency-hopping operations that can be performed in the third frequency-hopping mode.

The activation information includes, for example, a first field indicating whether to activate the first frequency-hopping mode and/or a second field indicating whether to activate the second frequency-hopping mode. The first field and the second field multiplex an existing frequency-hopping flag field in the DCI.

The frequency-hopping rule includes, for example, one or more of: a rule for determining which sub-band the UE is to be switched to when performing the frequency-hopping operation, and a rule for determining whether to perform the frequency-hopping operation. The frequency-hopping rule may further include processing for a situation in which a sub-band to which the UE is to be switched is occupied.

Exemplarily, the frequency-hopping rule includes one or more of: continuously performing the frequency-hopping operation, performing the frequency-hopping operation once every predetermined number of frequency-hopping operation periods, randomly determining a sub-band to be switched to, and switching to a sub-band next to a sub-band used by the UE before the frequency-hopping operation is performed.

In addition, the DCI may further include an indication indicating whether to activate the sub-band optimization mode. In the sub-band optimization mode, the UE selects a sub-band to be used for uplink transmission to perform channel idle detection on the selected sub-band to reduce fragmentation of the sub-bands.

To enable the UE to determine whether it is required to consider the influence of other UEs in selecting a sub-band, the method further includes providing the UE with information about a distance between the UE and another UE. The information of the distance, for example, includes information indicating whether the distance is near or far. In a case that the information about the distance includes information indicating that the distance is near, the UE selects the sub-bands taking the sub-band selection by the other UE into consideration.

The method further includes: acquiring, from each of UEs, an SINR of the UE; and determining information about the distance between the UE and another UE based on the SINR of each of the UEs.

It should be noted that the methods described above may be used in combination or individually, and the details thereof have been described in detail in the first embodiment and the second embodiment, which are not repeated herein.

The technology according to the present disclosure is applicable to various products.

For example, the electronic apparatus 200 may be implemented as various base stations. The base station may be implemented as any type of evolved node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote radio head ends (RRH) located at positions different from the main body. In addition, various types of user equipment may each serve as a base station by performing functions of the base station temporarily or semi-permanently.

The electronic apparatus 100 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

Application Examples Regarding a Base Station

First Application Example

Figure 15:
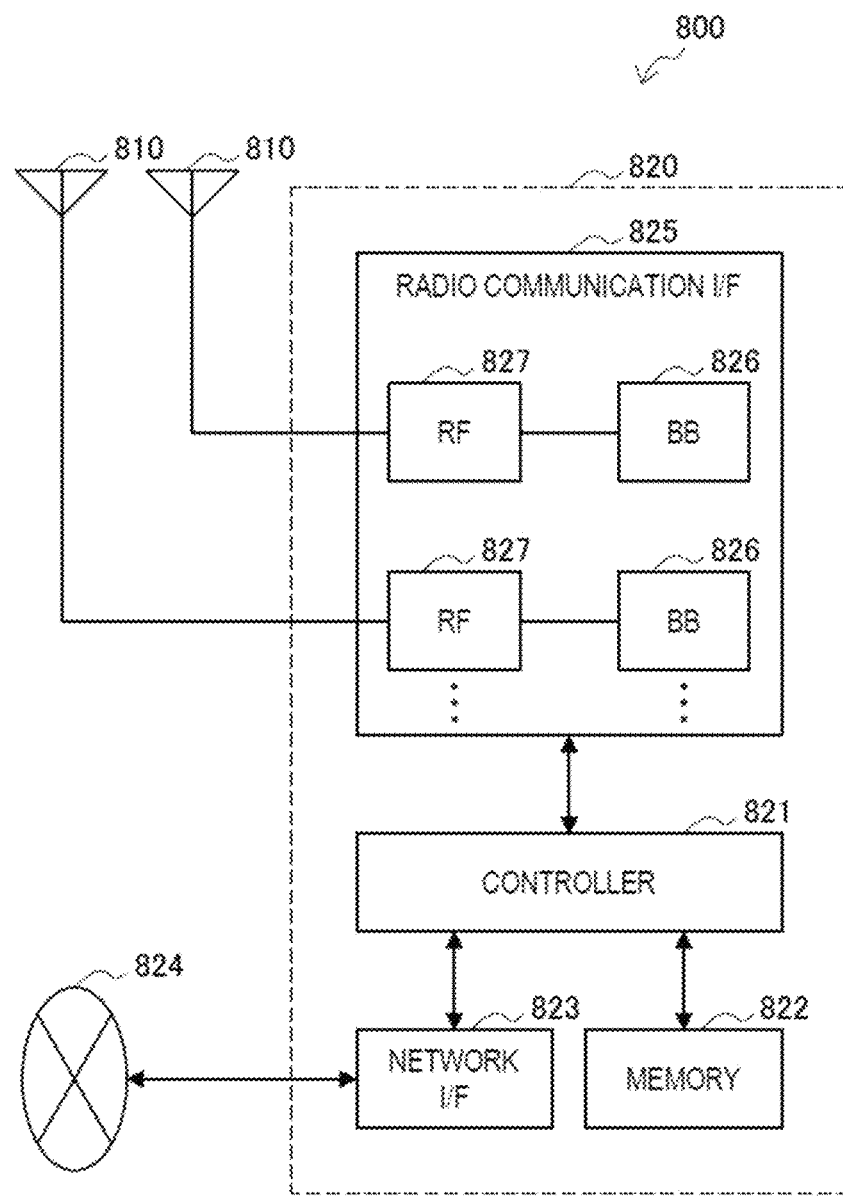
FIG. 15 is a block diagram showing a first example of an exemplary configuration of an eNB or gNB to which the technology of the present disclosure may be applied.

FIG. 15 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a RF cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 15, the eNB 800 may include the multiple antennas 810. For example, the multiple antennas 810 may be compatible with multiple frequency bands used by the eNB 800. Although FIG. 15 shows the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 15, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 15. For example, the multiple RF circuits 827 may be compatible with multiple antenna elements. Although FIG. 15 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 15, the first transmitting unit 201, the second transmitting unit 202, and the transceiver of the electronic apparatus 200 may be implemented by the radio communication interface 825. At least a part of the functions may also be implemented by the controller 821. For example, the controller 821 may configure and instruct the frequency-hopping operation of the UE by performing the functions of the first transmitting unit 201 and the second transmitting unit 202.

Second Application Example

Figure 16:
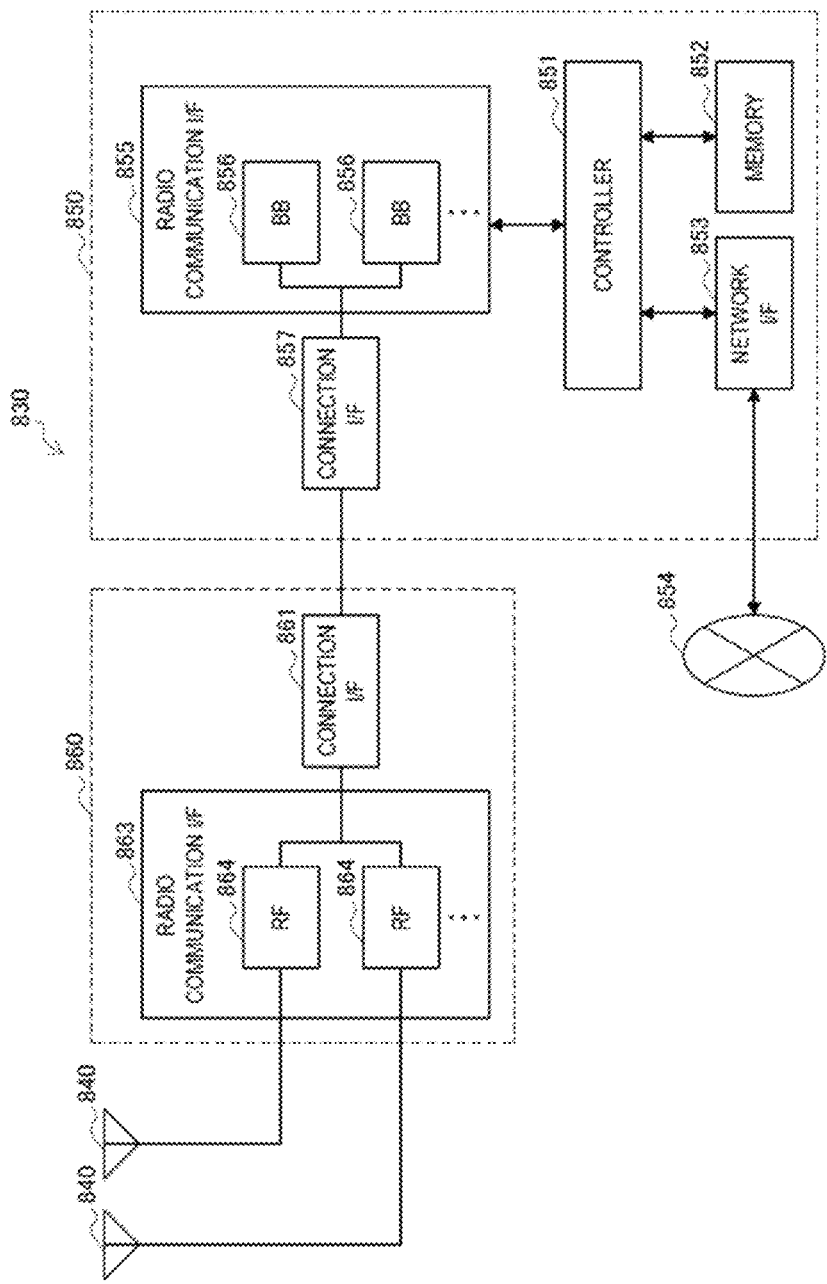
FIG. 16 is a block diagram showing a second example of an exemplary configuration of an eNB or gNB to which the technology of the present disclosure may be applied.

FIG. 16 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 16, the eNB 830 may include the multiple antennas 840. For example, the multiple antennas 840 may be compatible with multiple frequency bands used by the eNB 830. Although FIG. 16 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 15.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 15, except that the BB processor 856 is connected to an RF circuit 864 of the RRH 860 via the connection interface 857. As show in FIG. 16, the radio communication interface 855 may include the multiple BB processors 856. For example, the multiple BB processors 856 may be compatible with multiple frequency bands used by the eNB 830. Although FIG. 16 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 16. For example, the multiple RF circuits 864 may support multiple antenna elements. Although FIG. 16 shows the example in which the radio communication interface 863 includes the multiple RF circuits 864, the radio communication interface 863 may also include a single RF circuit 864.

In the eNB 830 as shown in FIG. 16, the first transmitting unit 201, the second transmitting unit 202, and the transceiver of the electronic apparatus 200 may be implemented by the radio communication interface 855 and/or the radio communication interface 863. At least a part of the functions may also be implemented by the controller 851. For example, the controller 851 may configure and instruct the frequency-hopping operation of the UE by performing the functions of the first transmitting unit 201 and the second transmitting unit 202.

Application Examples Regarding User Equipment

First Application Example

Figure 17:
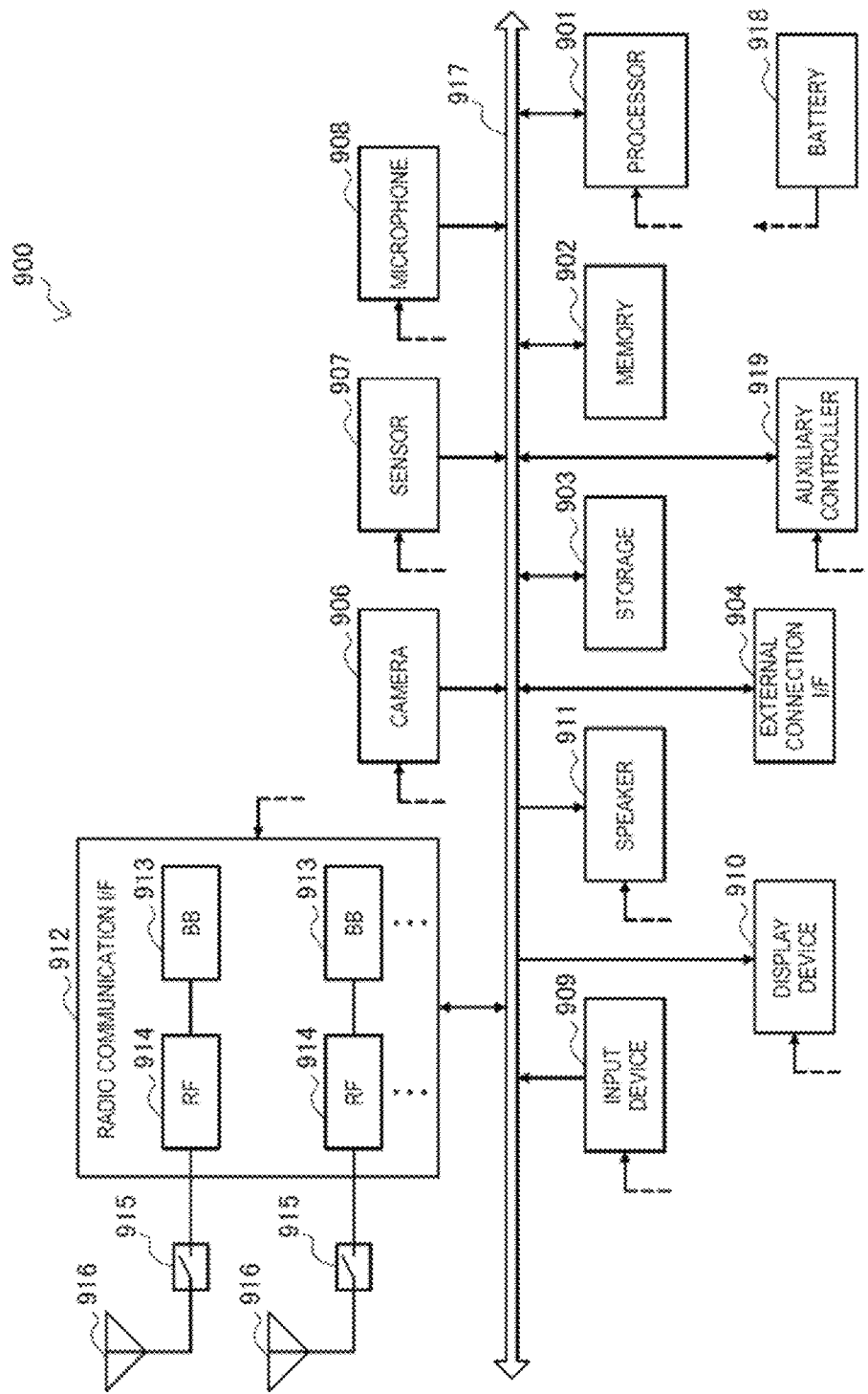
FIG. 17 is a block diagram showing an example of an exemplary configuration of a smartphone to which the technology according to the present disclosure may be applied.

FIG. 17 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 17 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 17. Although FIG. 17 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 17. Although FIG. 17 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 17 via feeder lines that are partially shown as dashed lines in FIG. 17. The auxiliary controller 919, for example, operates a minimum necessary function of the smart phone 900 in a sleep mode.

In the smart phone 900 as shown in FIG. 17, the first acquiring unit 101, the second acquiring unit 102 and the transceiver of the electric apparatus 100 may be implemented by the radio communication interface 912. At least a part of the functions may also be implemented by the processor 901 or the auxiliary controller 919. For example, the processor 901 or the auxiliary controller 919 may perform the uplink frequency-hopping transmission of the UE among multiple sub-bands by performing the functions of the first acquiring unit 101, the second acquiring unit 102, and the execution unit 103.

Second Application Example

Figure 18:
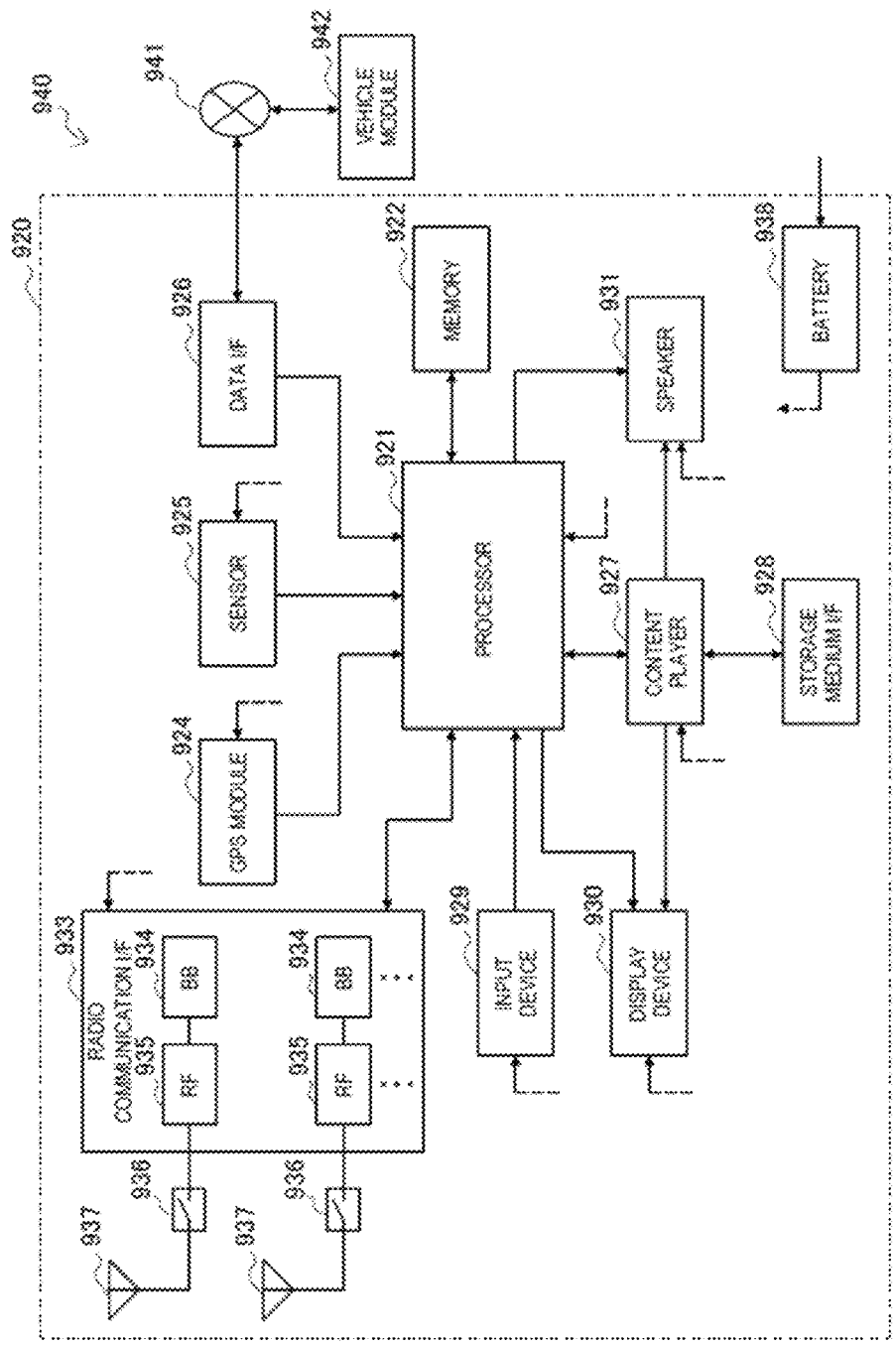
FIG. 18 is a block diagram showing an example of an exemplary configuration of a car navigation apparatus to which the technology according to the present disclosure may be applied.

FIG. 18 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 18. Although FIG. 18 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 18, the car navigation apparatus 920 may include the multiple antennas 937. Although FIG. 18 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 18 via feeder lines that are partially shown as dash lines in FIG. 18. The battery 938 accumulates power supplied from the vehicle.

In the car navigation device 920 shown in FIG. 18, the first acquiring unit 101, the second acquiring unit 102 and the transceiver of the electric apparatus 100 may be implemented by the radio communication interface 933. At least a part of the functions may also be implemented by the processor 921. For example, the processor 921 may perform the uplink frequency-hopping transmission of the UE among multiple sub-bands by performing the functions of the first acquiring unit 101, the second acquiring unit 102, and the execution unit 103.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1900 shown in FIG. 19) from a storage medium or network, wherein the computer is capable of implementing various functions when installed with various programs.

Figure 19:
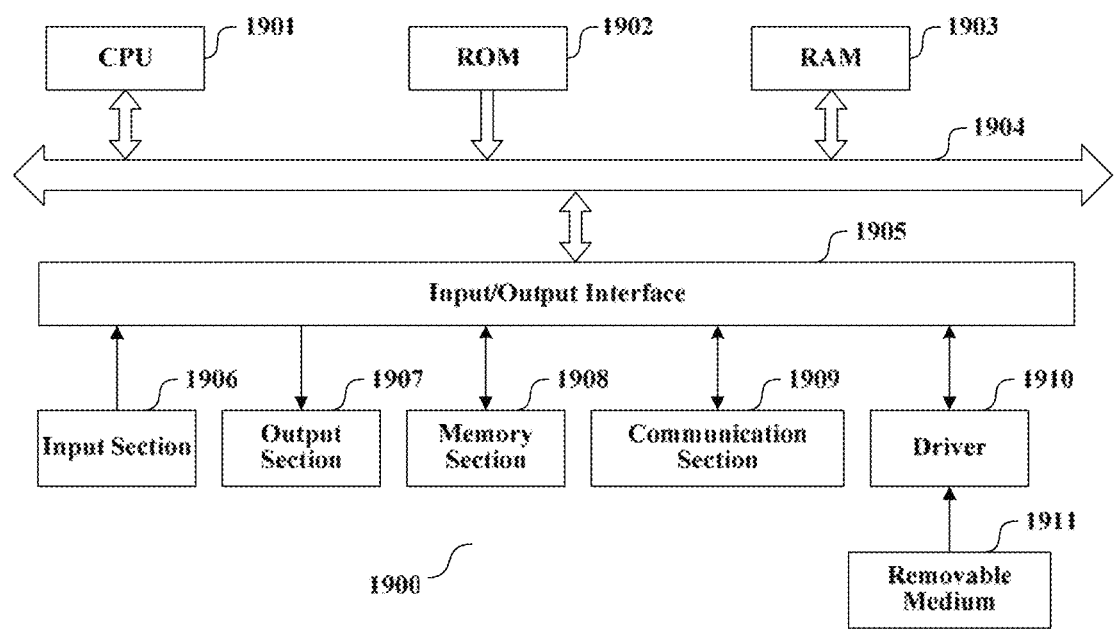
FIG. 19 is a block diagram of an exemplary block diagram illustrating the structure of a general purpose personal computer capable of realizing the method and/or device and/or system according to the embodiments of the present disclosure.

In FIG. 19, a central processing unit (CPU) 1901 executes various processing according to a program stored in a read-only memory (ROM) 1902 or a program loaded to a random access memory (RAM) 1903 from a memory section 1908. The data needed for the various processing of the CPU 1901 may be stored in the RAM 1903 as needed. The CPU 1901, the ROM 1902 and the RAM 1903 are linked with each other via a bus 1904. An input/output interface 1905 is also linked to the bus 1904.

The following components are linked to the input/output interface 1905: an input section 1906 (including keyboard, mouse and the like), an output section 1907 (including displays such as a cathode ray tube (CRT), a liquid crystal display (LCD), a loudspeaker and the like), a memory section 1908 (including hard disc and the like), and a communication section 1909 (including a network interface card such as a LAN card, modem and the like). The communication section 1909 performs communication processing via a network such as the Internet. A driver 1910 may also be linked to the input/output interface 1905, if needed. If needed, a removable medium 1911, for example, a magnetic disc, an optical disc, a magnetic optical disc, a semiconductor memory and the like, may be installed in the driver 1910, so that the computer program read therefrom is installed in the memory section 1908 as appropriate.

In the case where the foregoing series of processing is achieved through software, programs forming the software are installed from a network such as the Internet or a memory medium such as the removable medium 1911.

It should be appreciated by those skilled in the art that the memory medium is not limited to the removable medium 1911 shown in FIG. 19, which has program stored therein and is distributed separately from the apparatus so as to provide the programs to users. The removable medium 1911 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1902 and the memory section 1908 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   acquire, from a base station, a radio resource control (RRC) signaling which comprises configuration information of a frequency-hopping operation for uplink transmission in wide band of a user equipment on an unlicensed frequency band, wherein the user equipment switches among multiple sub-bands in the wide band to perform the uplink transmission by the frequency-hopping operation; and
   acquire, from the base station, downlink control information which comprises activation information for the frequency-hopping operation,
   wherein the configuration information comprises information about a frequency-hopping mode, wherein the frequency-hopping mode comprises one or more of:
a first frequency-hopping mode, in which the user equipment performs the frequency-hopping operation among a plurality of consecutive channel occupation times (COTs),
a second frequency-hopping mode, in which the user equipment performs the frequency-hopping operation among a plurality of uplink transmission sections within one COT, and
a third frequency-hopping mode, in which the user equipment performs the frequency-hopping operation among periodic uplink transmissions of configured grant scheduling
wherein the activation information comprises indication information of a frequency-hopping mode to be activated,
wherein the information about the frequency-hopping mode comprises one or more of: the number of the plurality of consecutive COTs, the number of interval time slots between adjacent uplink transmissions in the third frequency-hopping mode, and the number of frequency-hopping operations that can be performed in the third frequency-hopping mode,
wherein the activation information comprises a first field indicating whether to activate the first frequency-hopping mode and/or a second field indicating whether to activate the second frequency-hopping mode,
wherein the first field and the second field multiplex an existing frequency-hopping flag field in the downlink control information.

2. The electronic apparatus according to claim 1, wherein the processing circuitry is configured to perform the frequency-hopping operation on a sub-band on which the uplink transmission is performed in response to the downlink control information, or
in a case that the user equipment is to perform the frequency-hopping operation on a plurality of sub-bands, the processing circuitry is configured to perform the frequency-hopping operation on each of the plurality of sub-bands respectively, and based on a post-hopping sub-band collision occurring in two or more sub-bands among the plurality of sub-bands, perform the frequency-hopping operation again on the two or more sub-bands involved in the post-hopping sub-band collision until the post-hopping sub-band collision does not occur.

3. The electronic apparatus according to claim 2, wherein the processing circuitry is further configured to, in a case that the plurality of sub-bands are adjacent to each other, perform the frequency-hopping operation by taking the plurality of sub-bands as one sub-band.

4. The electronic apparatus according to claim 1, wherein the downlink control information further comprises an indication indicating whether to activate a sub-band optimization mode in which the processing circuitry is configured to select a sub-band to be used for uplink transmission to perform channel idle detection on the selected sub-band to reduce fragmentation of the sub-bands.

5. The electronic apparatus according to claim 4, wherein in the sub-band optimization mode, the processing circuitry is further configured to select the sub-band based on a distance between the user equipment and another user equipment.

6. The electronic apparatus according to claim 5, wherein the processing circuitry is configured to acquire, from the base station, information about the distance between the user equipment and another user equipment.

7. The electronic apparatus according to claim 6, wherein the processing circuitry is further configured to report a signal to interference and noise ratio of the user equipment to the base station, so that the base station determines the information of the distance between the user equipment and the other user equipment based on the signal to interference and noise ratio of each of user equipments.

8. The electronic apparatus according to claim 6, wherein the information of the distance between the user equipment and another user equipment comprises information indicating whether the distance between the user equipment and another user equipment is less than a predetermined threshold, and the processing circuitry is configured to, in a case that the information of the distance between the user equipment and another user equipment comprises the information indicating that the distance is less than a predetermined threshold, select the sub-band taking sub-band selection by the other user equipment into consideration.

9. The electronic apparatus according to claim 1, wherein the RRC signaling is a periodic semi-persistent scheduling RRC signaling.

10. An electronic apparatus for wireless communications, comprising:
processing circuitry, configured to:
transmit, to a user equipment, a radio resource control (RRC) signaling which comprises configuration information of a frequency-hopping operation for uplink transmission in wide band of the user equipment on an unlicensed frequency band, wherein the user equipment switches among multiple sub-bands in the wide band to perform the uplink transmission by the frequency-hopping operation; and
transmit, to the user equipment, downlink control information which comprises activation information for the frequency-hopping operation,
wherein the configuration information comprises information about a frequency-hopping mode,
wherein the frequency-hopping mode comprises one or more of:
a first frequency-hopping mode, in which the user equipment performs the frequency-hopping operation among a plurality of consecutive channel occupation times (COTs),
a second frequency-hopping mode, in which the user equipment performs the frequency-hopping operation among a plurality of uplink transmission sections within one COT, and
a third frequency-hopping mode, in which the user equipment performs the frequency-hopping operation among periodic uplink transmissions of configured grant scheduling,
wherein the activation information comprises indication information of a frequency-hopping mode to be activated,
wherein the downlink control information further comprises an indication indicating whether to activate a sub-band optimization mode in which the user equipment selects a sub-band to be used for uplink transmission to perform channel idle detection on the selected sub-band to reduce fragmentation of the sub-bands.

11. A method for wireless communications, comprising:
acquiring, from a base station, a radio resource control (RRC) signaling which comprises configuration information of a frequency-hopping operation for uplink transmission in wide band of a user equipment on an unlicensed frequency band, wherein the user equipment switches among multiple sub-bands in the wide band to perform the uplink transmission by the frequency-hopping operation; and acquiring, from the base station, downlink control information which comprises activation information for the frequency-hopping operation, wherein the configuration information comprises information about a frequency-hopping mode, wherein the activation information comprises indication information of a frequency-hopping mode to be activated, wherein the information about the frequency-hopping mode comprises one or more of: the number of the plurality of consecutive COTs, the number of interval time slots between adjacent uplink transmissions in the third frequency-hopping mode, and the number of frequency-hopping operations that can be performed in the third frequency-hopping mode, wherein the activation information comprises a first field indicating whether to activate the first frequency-hopping mode and/or a second field indicating whether to activate the second frequency-hopping mode, wherein the first field and the second field multiplex an existing frequency-hopping flag field in the downlink control information.

* * * * *